US011586283B1

(12) United States Patent
Yang et al.

(10) Patent No.: US 11,586,283 B1
(45) Date of Patent: Feb. 21, 2023

(54) ARTIFICIAL REALITY DEVICE HEADSET DONN AND DOFF DETECTION

(71) Applicant: Meta Platforms Technologies, LLC, Menlo Park, CA (US)

(72) Inventors: Dong Yang, Milpitas, CA (US); Qiang Zhang, Campbell, CA (US); Wen Song, Sammamish, WA (US); Theresa Loney Casarez, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/559,429

(22) Filed: Dec. 22, 2021

(51) Int. Cl.
*G06F 3/01* (2006.01)
*G01C 21/16* (2006.01)

(52) U.S. Cl.
CPC ............ *G06F 3/013* (2013.01); *G01C 21/16* (2013.01)

(58) Field of Classification Search
CPC .......... G06F 3/013; G06F 3/01; G01C 21/16; G02B 27/017; G02B 27/0176; G02B 2027/014; G02B 2027/0156; G02B 2027/0178; H05K 5/0017; H05K 5/03; A61B 5/6803; A61B 2562/0219; G02C 11/10
See application file for complete search history.

(56) References Cited

U.S. PATENT DOCUMENTS

| 2017/0123744 | A1* | 5/2017 | Park | G09G 5/003 |
| 2019/0026871 | A1* | 1/2019 | Han | G06T 3/4038 |
| 2019/0082169 | A1* | 3/2019 | Goossens | H04N 13/361 |
| 2021/0386366 | A1* | 12/2021 | Zakharov | A61B 3/00 |

* cited by examiner

Primary Examiner — Lunyi Lao
Assistant Examiner — Jarurat Suteerawongsa
(74) Attorney, Agent, or Firm — Potomac Law Group, PLLC

(57) ABSTRACT

Aspects of the present disclosure are directed to a multi-sensor don/doff detection system for an artificial reality device headset. The multi-sensor don/doff detection system can use a combination of a proximity sensor, an inertial measurement unit (IMU), and an eye tracking/face tracking (ET/FT) unit to make these determinations. However, when both the ET/FT system and proximity sensor system are active, they can have system coexistence issues. Thus, only one of these systems can be used simultaneously. The multi-sensor don/doff detection system can more accurately identify don events by using input from the proximity sensor and the IMU. The multi-sensor don/doff detection system can also more accurately identify doff events by using input from the IMU and either A) the proximity sensor when the ET/FT system is disabled or B) the ET/FT system when the ET/FT system is enabled.

20 Claims, 8 Drawing Sheets

ARTIFICIAL REALITY DEVICE HEADSET DONN AND DOFF DETECTION

TECHNICAL FIELD

The present disclosure is directed to devices and processes that detect when an artificial reality device headset has been put on (donned) or taken off (doffed).

BACKGROUND

Artificial reality device don/doff detection can directly impact battery life and user experience. In some existing system, don/doff detection is performed using one of a proximity sensor, a capacitance sensor, or a mechanical switch. However, each of these systems are prone to false positives and false negatives due to the wide range of user and environment conditions such as eye relief range, nose height, skin tone, whether the user is wearing glasses, hair style, IPD interference, light block interference, ambient lighting, sweat or environment moisture, rapid device movement, etc. While it's possible to use a combination of don/doff detection systems, such systems can interfere with each other, causing more problems than they solve.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
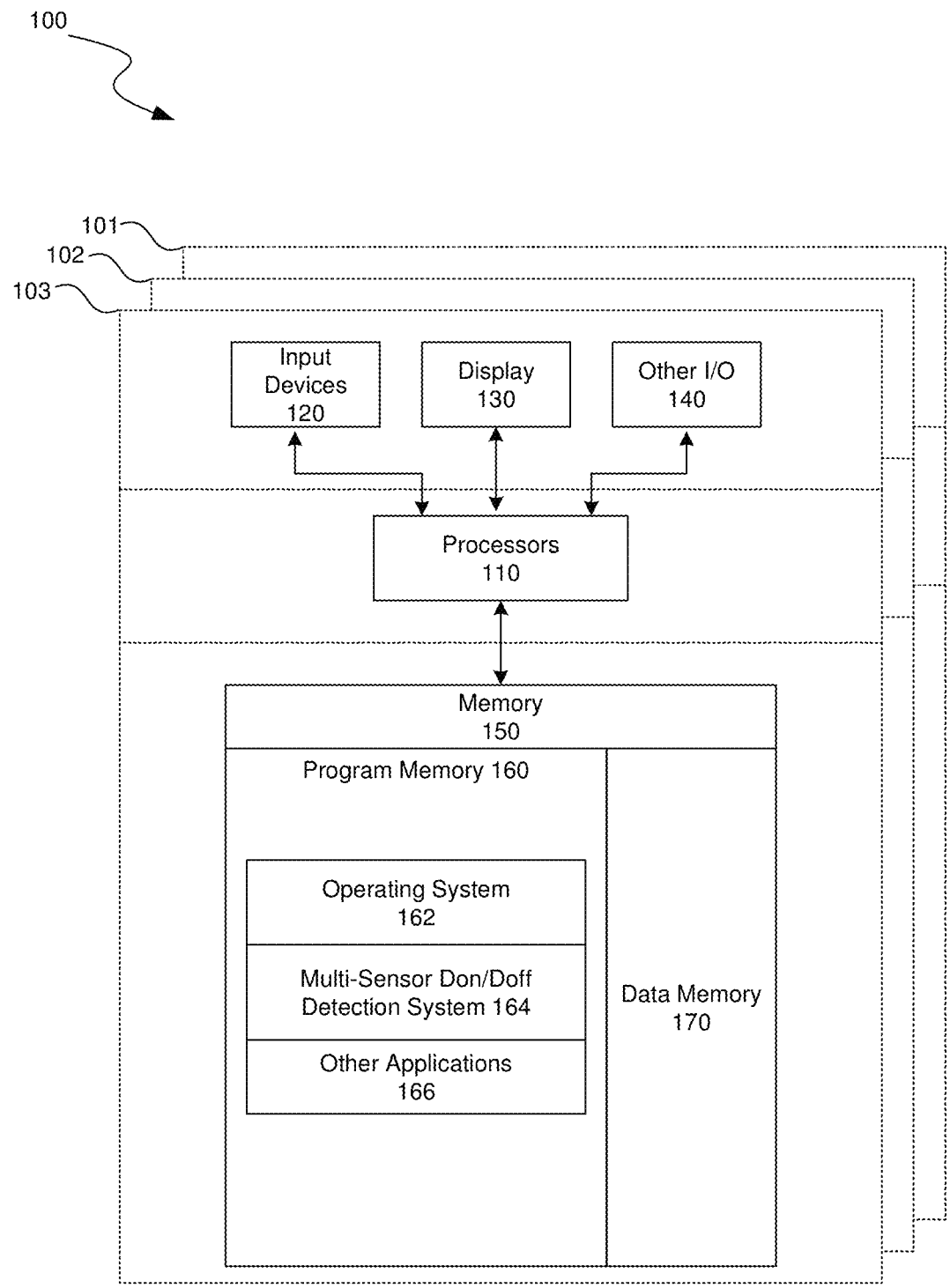
FIG. 1 is a block diagram illustrating an overview of devices on which some implementations of the present technology can operate.

Aspects of the present disclosure are directed to a multi-sensor don/doff detection system that determines, based on inputs from multiple detection systems, when an artificial reality device headset has been donned or doffed. The multi-sensor don/doff detection system can use a combination of a proximity ("prox.") sensor, an inertial measurement unit (IMU), and an eye tracking/face tracking (ET/FT) unit to make these determinations. However, both ET/FT sensors and proximity sensors sometimes work in the same frequency range and spatial areas, which can result in system coexistence issues (both from proximity sensor to ET/FT cameras and from illumination devices used by the ET/FT units to proximity sensors). Thus, when both the ET/FT system and proximity sensor system are active, this can result in false positive and/or false negative don/doff detections.

For example, when donning the artificial reality device headset, the multi-sensor don/doff detection system can have a false negative if the sensors are too insensitive, causing the artificial reality device headset to fail to initialize its display and disabled other systems; and the multi-sensor don/doff detection system can have a false positive if the sensors are too sensitive, causing the artificial reality device headset to turn on when the device was not actual worn, wasting battery and causing wear by unnecessarily initialize a display and other systems. Further, when doffing the artificial reality device headset, the multi-sensor don/doff detection system can have a false negative if the sensors are too insensitive, causing the artificial reality device headset to fail to turn off its display or other systems, wasting battery and causing unnecessary wear; and the multi-sensor don/doff detection system can have a false positive if the sensors are too sensitive, causing the artificial reality device headset to incorrectly turn off its display and other systems while still needed by the user.

The multi-sensor don/doff detection system can more accurately identify don events, and set a corresponding donned state variable, by using input from the proximity sensor and the IMU. These systems use low power and do not interfere with each other, and thus are ideal to be used for don detection. Further, because the ET/FT systems are not needed when the artificial reality device headset is not being worn, the ET/FT systems can be disabled so as not to interfere with the proximity sensor. The multi-sensor don/doff detection system can use input from the proximity sensor and the IMU by comparing each to a threshold, and when both are over the threshold, identifying a don event. For example, if the proximity sensor identifies an object as within 30 mm from it, for over 1 second and the IMU takes a force or angular velocity reading above a specified threshold, the don event can be identified.

The multi-sensor don/doff detection system can also more accurately identify doff events, and set a corresponding doffed state variable, by using input from the IMU and either A) the proximity sensor when the ET/FT system is disabled or B) the ET/FT system when the ET/FT system is enabled. Thus, the multi-sensor don/doff detection system uses the lower power proximity detection system when it will not be interfered with and uses the higher power ET/FT system when it is already enabled anyway (disabling the proximity sensors which may interfere with the ET/FT system). The multi-sensor don/doff detection system can use input from the proximity sensor and the IMU by identifying a doff event if either A) the proximity sensor reading does not meet a threshold for at least one second or B) the IMU reading does not meet a threshold for at least 2 minutes. The multi-sensor don/doff detection system can use input from the ET/FT system and the IMU by identifying a doff event if either A) the ET/FT system loses eye/face detection for at least one second or B) the IMU reading does not meet a threshold for at least 2 minutes.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can detect when an artificial reality device headset has been put on (donned) or taken off (doffed) according to multiple detection systems. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, multi-sensor don/doff detection system 164, and other application programs 166. Memory 150 can also include data memory 170 that can include IMU readings, proximity sensor readings, ET/FT readings, reading thresholds for don and doff detection, ET/FT status identifiers, don/doff state identifiers, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
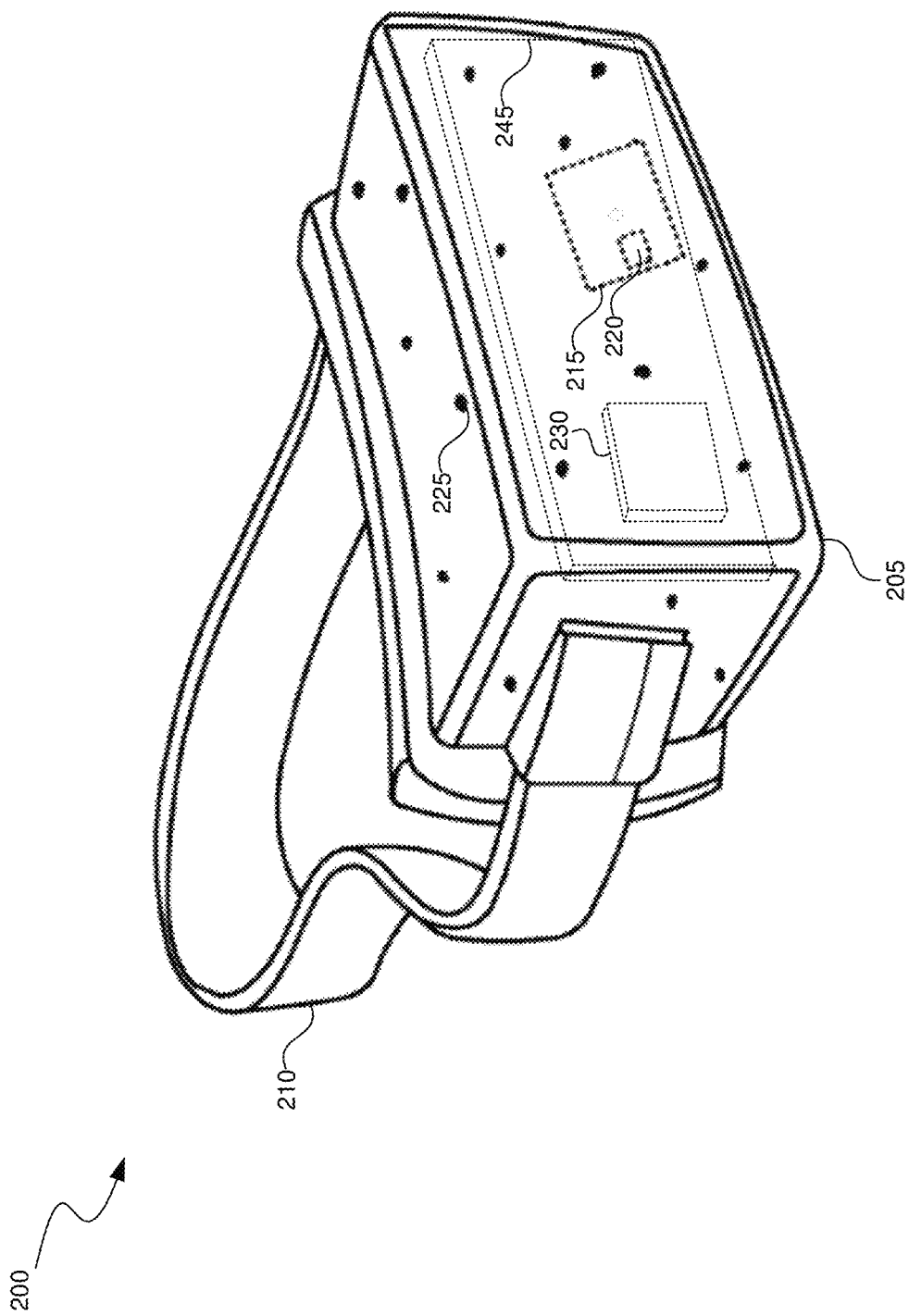
FIG. 2A is a wire diagram illustrating a first view of a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial measurement unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
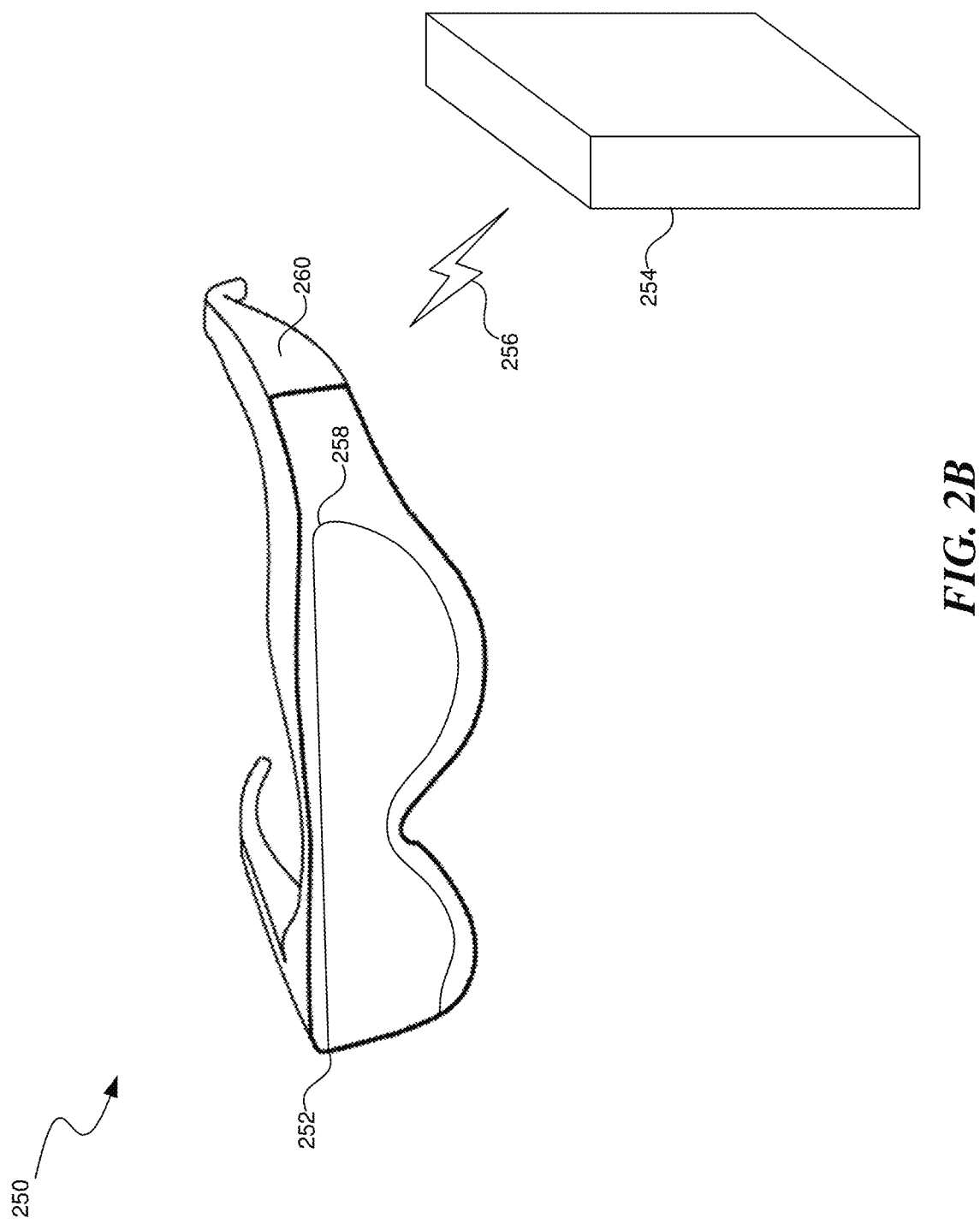
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
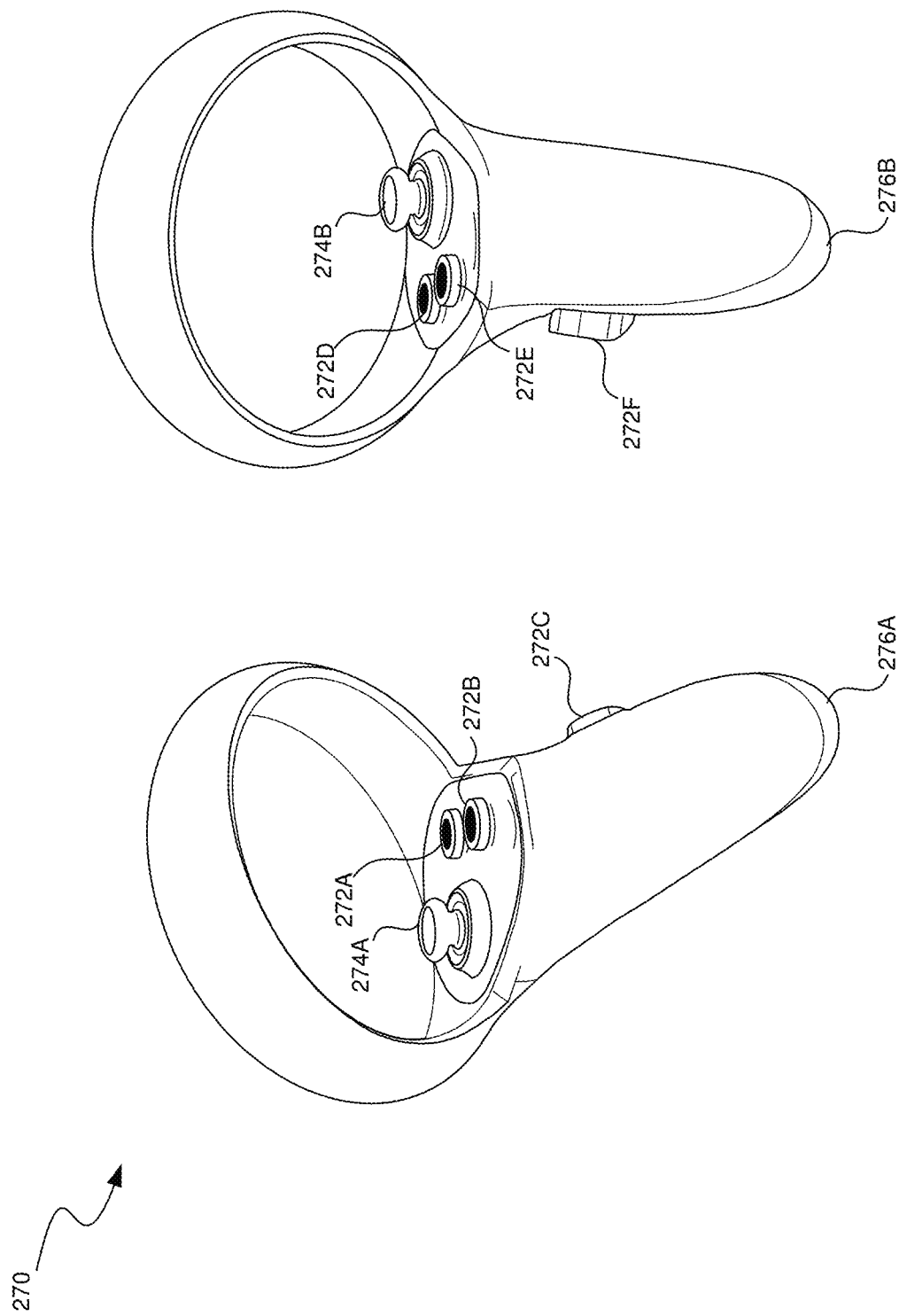
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

Figure 2D:
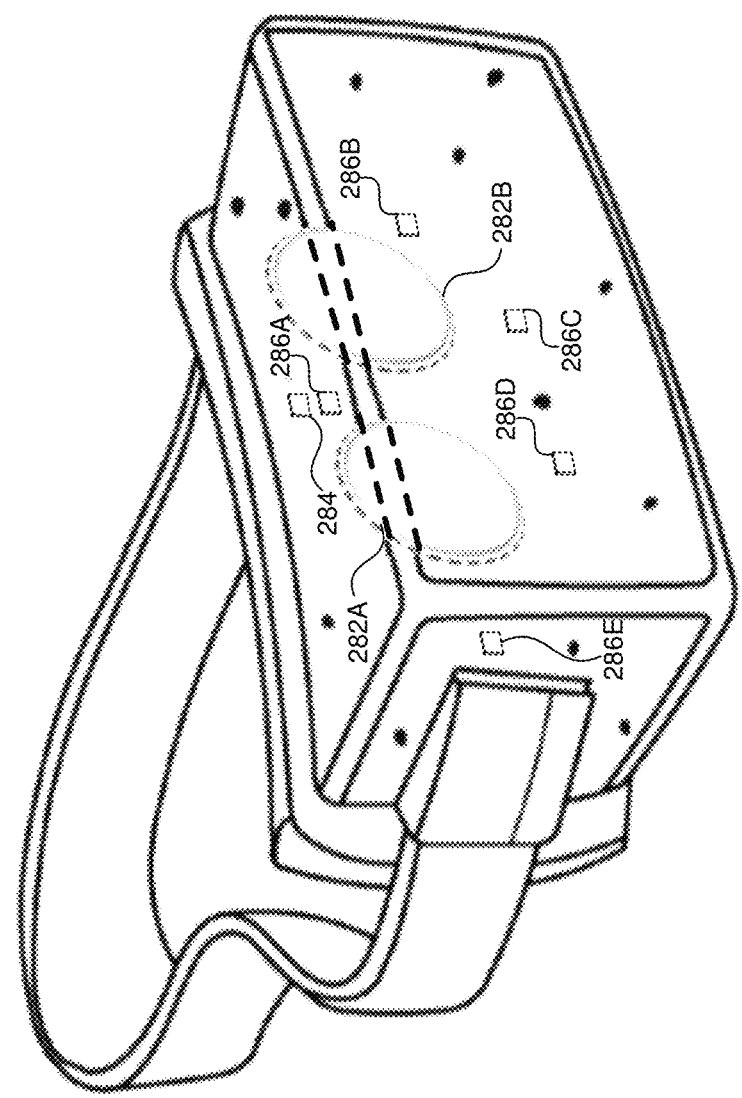
FIG. 2D is a wire diagram illustrating a second view of the virtual reality headset which can be used in some implementations of the present technology.

FIG. 2D is a wire diagram illustrating a second view of the artificial reality device headset 280 which can be used in some implementations of the present technology. In some implementations, the artificial reality device headset 280 is the same as, or shares components with, the virtual reality HMD 200 or the mixed reality HMD system 250. The artificial reality device headset 280 can include lenses 282A and 282B. The artificial reality device headset 280 can include a proximity sensor 284, which can emit a beam, such as infrared light, and detect how the beam rebounds off a target to get the distance to that target. The artificial reality device headset 280 can include an eye tracking face tracking (ET/FT) system, including ET/FT cameras 286A-286E. In some implementations, these ET/FT cameras can run at 72 Hz or 90 Hz. One or more light sources can illuminate either or both of the user's eyes in front of the lenses 282 and the ET/FT cameras can capture a reflection of this light to determine eye position (e.g., based on set of reflections around the user's cornea), modeling the user's eye and determining a gaze direction. The ET/FT cameras 286 can also capture portions of the user's face to detect, e.g., facial expressions.

In various implementations, the HMD 200, 250, or artificial reality device headset can also include additional subsystems, such as an audio system, various network components, etc., to monitor indications of user interactions and intentions. For example, in some implementations, instead of or in addition to controllers, one or more cameras included in the HMD 200, HMD 250, or artificial reality device headset 280 or from external cameras, can monitor the positions and poses of the user's hands to determine gestures and other hand and body motions.

Figure 3:
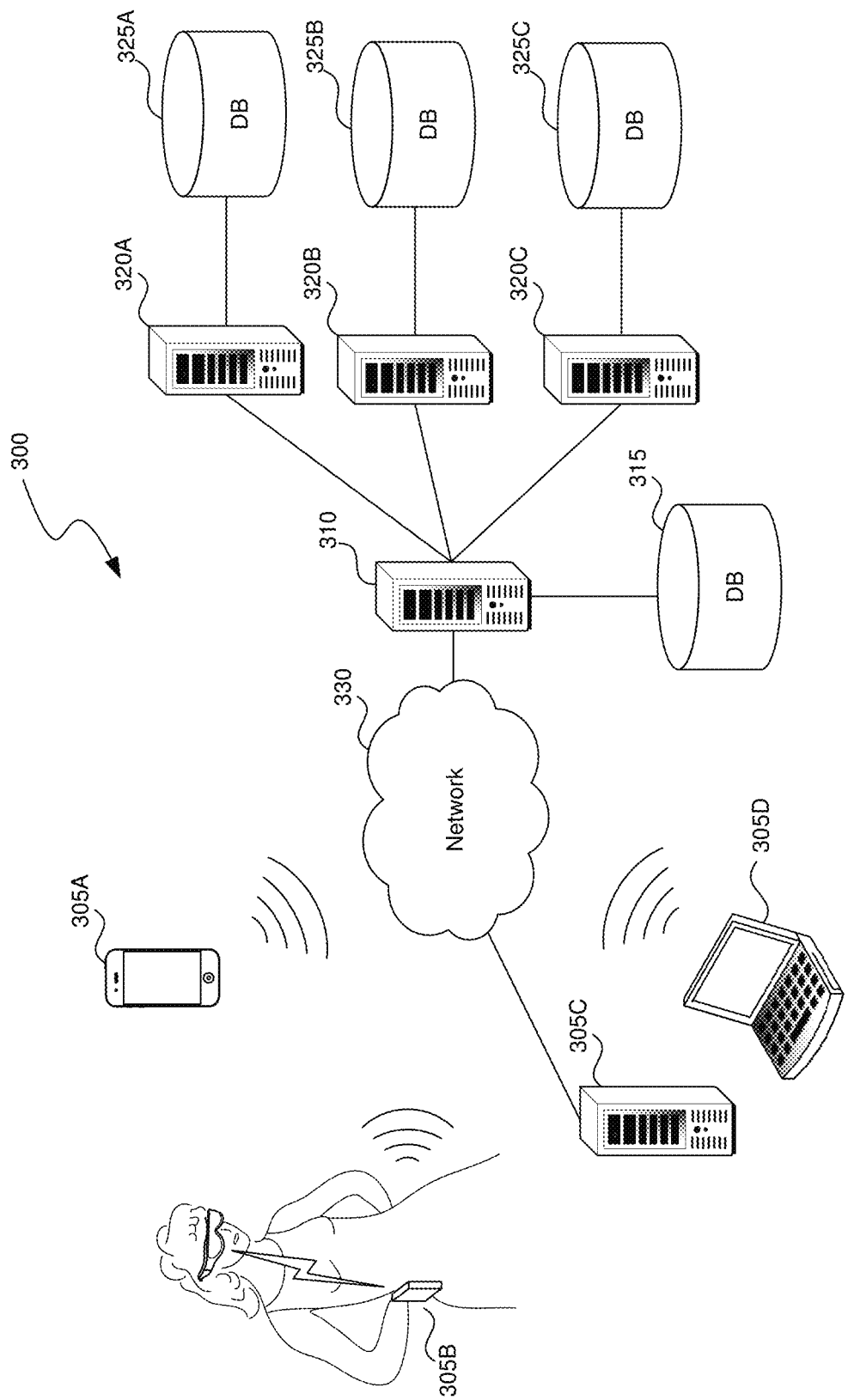
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
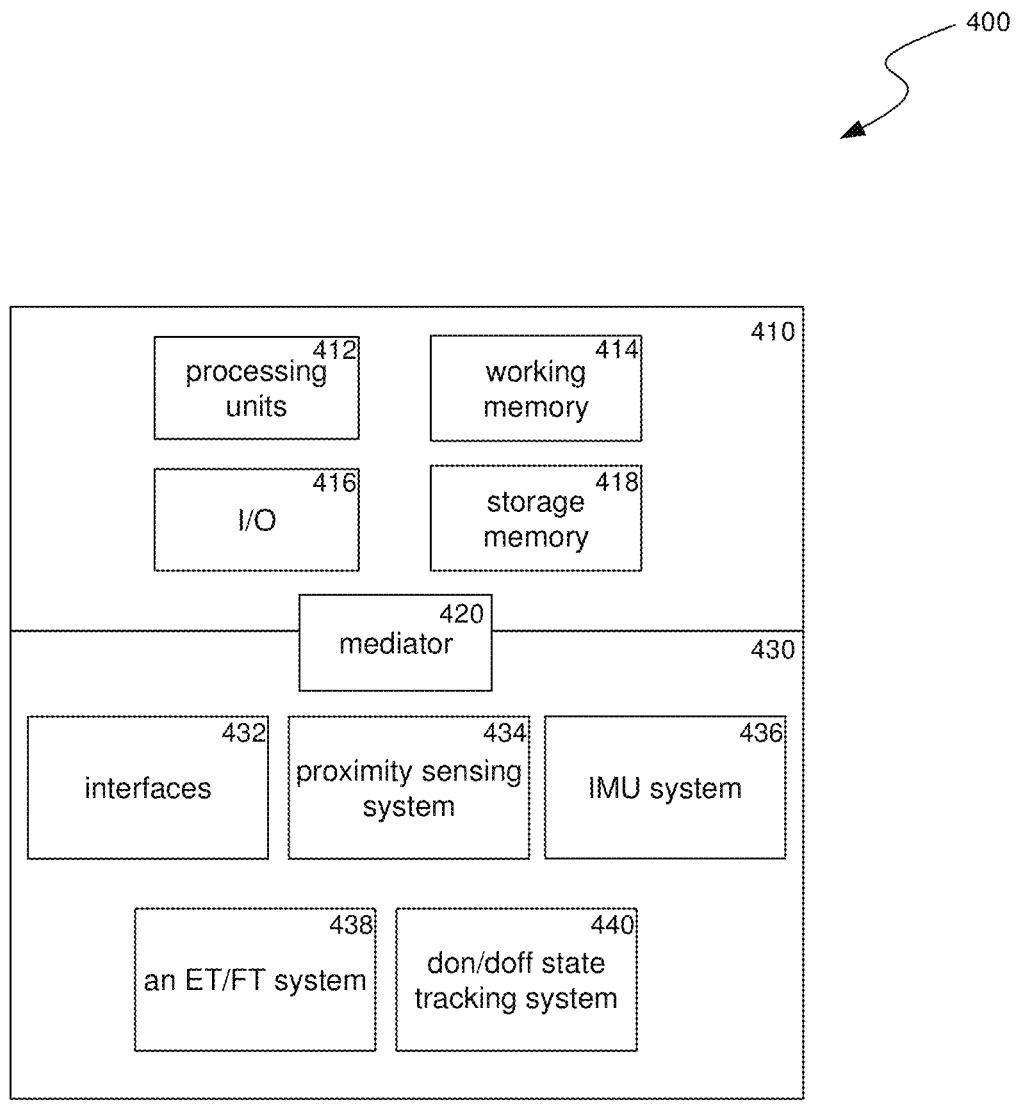
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for determining, based on inputs from multiple detection systems, when an artificial reality device headset has been donned or doffed. Specialized components 430 can include a proximity sensing system 434, an IMU system 436, an ET/FT system 438, a don/doff state tracking system 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The proximity sensing system 434 can interact with a proximity sensor of I/O 416 to get proximity sensor readings and can compare these readings to a proximity don threshold or a proximity doff threshold (which may be the same or different thresholds), and report the comparison result to the don/doff state tracking system 440. Proximity sensing system 434 can also disable the proximity sensor of I/O 416 when the ET/FT system 438 indicates the ET/FT devices of I/O 416 are enabled and enable the proximity sensor of I/O 416 when the ET/FT system 438 indicates the ET/FT devices of I/O 416 are disabled. Additional details on tracking proximity sensing readings as compared to thresholds and controlling the proximity sensors status are provided below in relation to blocks 502 and 510 of FIG. 5.

The IMU system 436 can interact with a IMU system of I/O 416 to get IMU readings and can compare these readings to an IMU don threshold or an IMU doff threshold (which may be the same or different thresholds), and report the comparison result to the don/doff state tracking system 440. Additional details on tracking IMU readings as compared to thresholds are provided below in relation to blocks 502, 508, and 510 of FIG. 5.

The ET/FT system 438 can interact with ET/FT devices of I/O 416 to get ET/FT status readings and can compare how long these readings are in a given state (eye detected, eye not detected, face detected, face not detected) to an ET/FT timing doff threshold and report the comparison result to the don/doff state tracking system 440. ET/FT system 438 can also disable and enable the ET/FT devices of I/O 416, e.g., in response to these systems being indicated as used by a current application. Additional details on tracking ET/FT state readings as compared to a timing threshold and controlling the ET/FT devices are provided below in relation to blocks 506 and 508 of FIG. 5.

The don/doff state tracking system 440 can track whether the artificial reality device headset is being worn by a user (i.e., in a donned state) or is not being worn by a user (i.e., in a doffed state).

When in the doffed state, don/doff state tracking system 440 can get the proximity threshold comparison from the proximity sensing system 434 and can get the IMU to don threshold comparison from the IMU system 436 and, if both comparisons evaluate to true, can set the don/doff state to the donned state.

When in the donned state and the ET/FT system 438 indicates the ET/FT devices are enabled, don/doff state tracking system 440 can get the ET/FT timing comparison from the ET/FT system 438 and can get the IMU to doff threshold comparison from the IMU system 436, and if either comparison evaluates to true, can set the don/doff state to the doffed state.

When in the donned state and the ET/FT system 438 indicates the ET/FT devices are disabled, don/doff state tracking system 440 can get the proximity threshold comparison from the proximity sensing system 434 and can get the IMU to doff threshold comparison from the IMU system 436, and if either comparison evaluates to true, can set the don/doff state to the doffed state.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
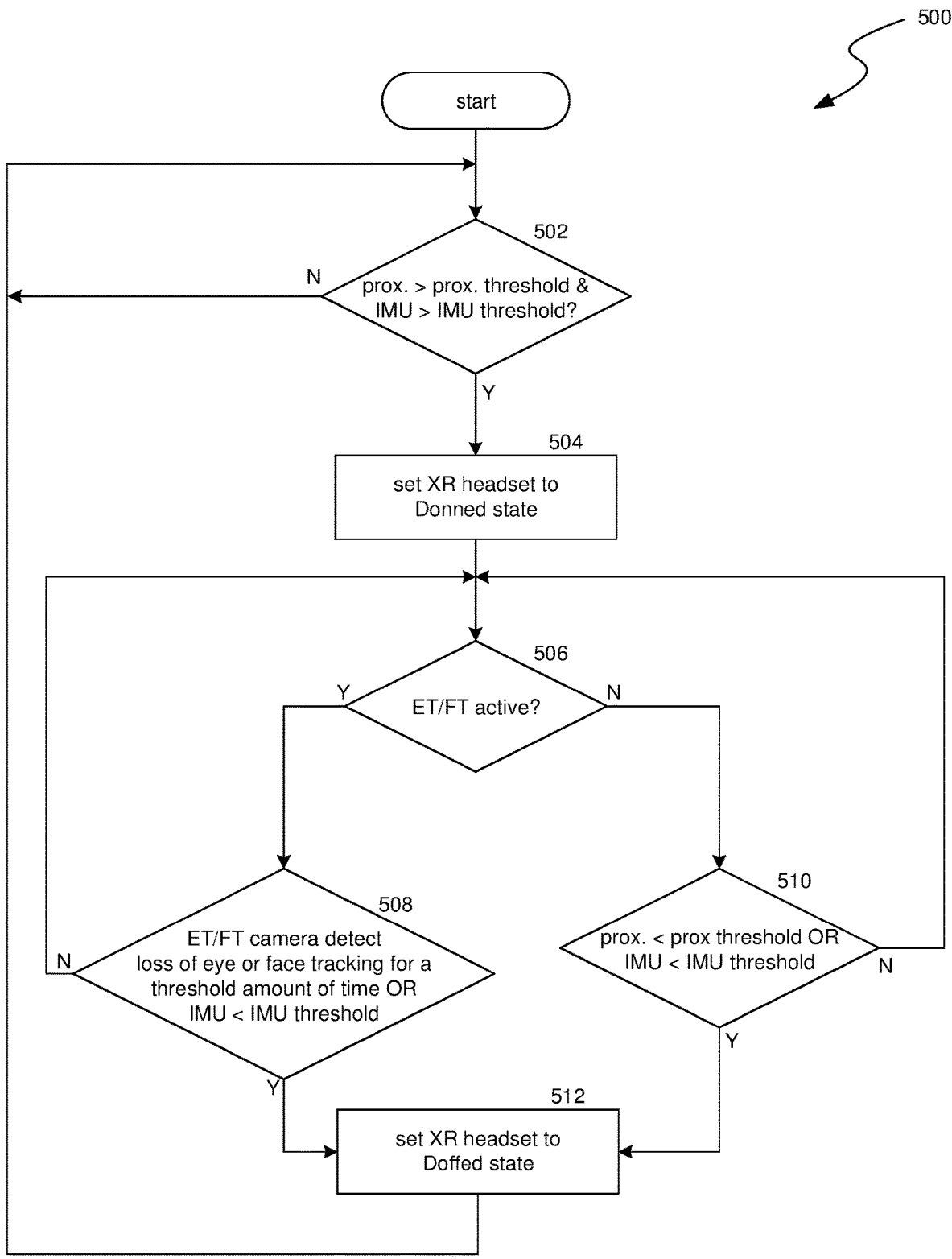
FIG. 5 is a flow diagram illustrating a process used in some implementations of the present technology for setting an artificial reality device headset don or doff state according to a combination of two of IMU sensors, proximity sensors, and eye tracking/face tracking cameras.

FIG. 5 is a flow diagram illustrating a process 500 used in some implementations of the present technology for setting an artificial reality device headset's ("headset") don or doff state according to a combination of two of an IMU sensor, a proximity sensor, and an eye tracking/face tracking system. Process 500 can be performed by an artificial reality device, e.g., as a sub-process of an operating system of the artificial reality device. In some implementations, process 500 can start, when the headset is in a doffed state, at block 502. In other implementations, process 500 can start, when the headset is in a donned state, at block 506 instead.

At block 502, process 500 can determine whether a current set of readings from the proximity sensor are above a proximity don threshold and whether a current set of readings from the IMU are above an IMU don threshold. The readings from the proximity sensor can be above the proximity don threshold when they indicate there is an object (i.e., the user's face) within 30 mm of the proximity sensor for at least one second. The readings from the IMU can be above the IMU don threshold when a movement above a threshold force or above an angular velocity is measured. If both the current set of readings from the proximity sensor are above the proximity don threshold and the current set of readings from the IMU are above the IMU don threshold, process 500 can continue to block 504; otherwise process 500 can stay at block 502.

At block 504, process 500 can set an artificial reality device headset to a donned state. This can include, for example, setting an environment variable, defined in the operating system of the artificial reality device headset, to a value corresponding to the headset being donned.

At block 506, process 500 can determine whether an ET/FT system is active. This can be accomplished by checking whether hardware (through status indicators in the operating system or other control system) of the ET/FT system is emitting light and/or capturing light or by checking wither any current application executing on the artificial reality device uses the ET/FT system and therefore has enabled it. If the ET/FT system is active, process 500 can proceed to block 508; otherwise process 500 can proceed to block 510.

At block 508, process 500 can determine if either the ET/FT system doesn't recognize a face or eye for a threshold amount of time (e.g., 1 second) or if all readings from the IMU are below an IMU doff threshold for an amount of time (e.g., 2 minutes). If neither is true, process 500 can return to block 506. If either is true, process 500 can proceed to block 512.

At block 510, process 500 can determine if either a current set of readings from the proximity sensor are below a proximity doff threshold (e.g., no measurement of an object within 30 mm) for a threshold amount of time (e.g., 1 second) or if all readings from the IMU are below an IMU doff threshold for an amount of time (e.g., 2 minutes). If neither is true, process 500 can return to block 506. If either is true, process 500 can proceed to block 512.

At block 512, process 500 can set the artificial reality device headset to a doffed state. This can include, for example, setting an environment variable, defined in the operating system of the artificial reality device headset, to a value corresponding to the headset being doffed. Process 500 can repeat while the headset is powered on, returning to block 502.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. Method for determining, based on inputs from multiple detection systems, when an artificial reality device headset has been donned or doffed, the method comprising:
   from the artificial reality device headset being in a doffed state,
      determining that both:
         a current proximity reading set is above a proximity donned threshold; and
         a current Inertial Measurement Unit (IMU) reading set is above an IMU donned threshold; and
      in response, changing the artificial reality device headset to being in a donned state; and
   from the artificial reality device headset being in the donned state,
      when an eye tracking/face tracking (ET/FT) system is active:
         determining A) whether a current ET/FT reading set indicates a loss of eye or face tracking for a threshold amount of time and B) whether a current IMU reading set is below an IMU doffed threshold; and
         in response to either A) or B) being true, changing the artificial reality device headset to being in the doffed state; and
      when an ET/FT system is not active:
         determining C) whether a current proximity reading set is below a proximity doffed threshold and D) whether a current IMU reading set is below an IMU doffed threshold; and
         in response to either C) or D) being true, changing the artificial reality device headset to being in the doffed state.

2. The method of claim 1, wherein:
   the determining that the current proximity reading set is above the proximity donned threshold includes determining that an object is detected within 30 mm of a proximity sensor for at least one second; and
   the determining whether the current proximity reading set is below the proximity doffed threshold includes determining that no object is detected within 30 mm of the proximity sensor for at least one second.

3. The method of claim 1, wherein:
   the determining that the current proximity reading set is above the proximity donned threshold includes determining that an object is detected within a threshold distance of a proximity sensor for at least a threshold amount of time; and
   the determining whether the current proximity reading set is below the proximity doffed threshold includes determining that no object is detected within the threshold distance of the proximity sensor for at least the threshold amount of time.

4. The method of claim 1, wherein the determining whether the current IMU reading set is below the IMU doffed threshold includes determining that a force or angular velocity, measured by the IMU, is less than a threshold force or angular velocity for at least a threshold time.

5. The method of claim 1, wherein the determining whether the current IMU reading set is below the IMU doffed threshold includes determining that a force or angular velocity, measured by the IMU, is less than a threshold force or angular velocity for at least two minutes.

6. The method of claim 1 further comprising determining whether the ET/FT system is active by determining whether any active applications on the artificial reality device are configured to enable the ET/FT system.

7. The method of claim 1, wherein the threshold amount of time used in determining whether the current ET/FT reading set indicates the loss of eye or face tracking, is one second.

8. A non-transitory computer-readable storage medium storing instructions that, when executed by a computing system, cause the computing system to perform a process for determining, based on inputs from multiple detection systems, when an artificial reality device headset has been donned or doffed, the process comprising:
   when an eye tracking/face tracking (ET/FT) system is active:
      determining A) whether a current ET/FT reading set indicates a loss of eye or face tracking for a threshold amount of time and B) whether a current Inertial Measurement Unit (IMU) reading set is below an IMU doffed threshold; and in response to either A) or B) being true, changing the artificial reality device headset to being in a doffed state; and when an ET/FT system is not active:

determining C) whether a current proximity reading set is below a proximity doffed threshold and D) whether a current IMU reading set is below an IMU doffed threshold; and in response to either C) or D) being true, changing the artificial reality device headset to being in the doffed state.

9. The non-transitory computer-readable storage medium of claim 8, wherein the process further comprises: determining that both: a current proximity reading set is above a proximity donned threshold; and a current IMU reading set is above an IMU donned threshold; and in response, changing the artificial reality device headset to being in a donned state.

10. The non-transitory computer-readable storage medium of claim 9, wherein: the determining that the current proximity reading set is above the proximity donned threshold includes determining that an object is detected within a threshold distance of a proximity sensor for at least a threshold amount of time; and the determining whether the current proximity reading set is below the proximity doffed threshold includes determining that no object is detected within the threshold distance of the proximity sensor for at least the threshold amount of time.

11. The non-transitory computer-readable storage medium of claim 8, wherein the determining whether the current IMU reading set is below the IMU doffed threshold includes determining that a force or angular velocity, measured by the IMU, is less than a threshold force or angular velocity for at least a threshold time.

12. The non-transitory computer-readable storage medium of claim 8, wherein the determining whether the current IMU reading set is below the IMU doffed threshold includes determining that a force or angular velocity, measured by the IMU, is less than a threshold force or angular velocity for at least two minutes.

13. The non-transitory computer-readable storage medium of claim 8, wherein the process further comprises determining when the ET/FT system is active by determining whether any active applications on the artificial reality device are configured to enable the ET/FT system.

14. The non-transitory computer-readable storage medium of claim 8, wherein the threshold amount of time used in determining whether the current ET/FT reading set indicates the loss of eye or face tracking, is in the range of one-half to three seconds.

15. A computing system for determining, based on inputs from multiple detection systems, when an artificial reality device headset has been donned or doffed, the computing system comprising:

one or more processors; and one or more memories storing instructions that, when executed by the one or more processors, cause the computing system to perform a process comprising:

when an eye tracking/face tracking (ET/FT) system is active:

determining whether a current ET/FT reading set indicates a loss of eye or face tracking for a threshold amount of time or whether a current Inertial Measurement Unit (IMU) reading set is below an IMU doffed threshold; and in response, changing the artificial reality device headset to being in the doffed state; and when an ET/FT system is not active:

determining whether a current proximity reading set is below a proximity doffed threshold or whether a current IMU reading set is below an IMU doffed threshold; and in response, changing the artificial reality device headset to being in the doffed state.

16. The computing system of claim 15, wherein the process further comprises:

determining that both:

a current proximity reading set is above a proximity donned threshold; and a current IMU reading set is above an IMU donned threshold; and in response, changing the artificial reality device headset to being in a donned state.

17. The computing system of claim 15, wherein:

the determining whether the current proximity reading set is below the proximity doffed threshold includes determining that no object is detected within the threshold distance of the proximity sensor for at least the threshold amount of time.

18. The computing system of claim 15, wherein the determining whether the current IMU reading set is below the IMU doffed threshold includes determining that a force or angular velocity, measured by the IMU, is less than a threshold force or angular velocity for at least a threshold time.

19. The computing system of claim 15, wherein the process further comprises determining when the ET/FT system is active by determining whether any active applications on the artificial reality device are configured to enable the ET/FT system.

20. The computing system of claim 15, wherein the threshold amount of time used in determining whether the current ET/FT reading set indicates the loss of eye or face tracking, is at least one second.

* * * * *